Patented July 16, 1929.

1,721,057

UNITED STATES PATENT OFFICE.

WINFIELD SCOTT, OF WILMINGTON, DELAWARE, ASSIGNOR TO E. I. DU PONT DE NEMOURS & COMPANY, OF WILMINGTON, DELAWARE, A CORPORATION OF DELAWARE.

VULCANIZED RUBBER AND PROCESS OF MAKING THE SAME.

No Drawing.     Application filed June 20, 1922.   Serial No. 569,721.

This invention relates to vulcanized rubber compounds and to a process of making such compounds in which there is used as a vulcanization accelerator a ditolylguanidine, and particularly di-ortho-tolylguanidine.

The use of diphenylguanidine in vulcanizing rubber has heretofore been proposed, and tests have shown that it has certain advantages which make it a valuable accelerator. I have now discovered that a ditolylguandine, and especially di-o-tolylguanidine, having the following graphical formula:

has properties which render it a substantially better and more efficacious accelerator than is diphenylguanidine.

To illustrate the method of using the ditolylguanidine, and to make clear the distinction which exists between its accelerating action and that of diphenylguanidine, two rubber stocks, A and B, were prepared in accordance with the same formulas except that stock A contained 1% of diphenylguanidine, whereas stock B contained 1% of di-o-tolylguanidine. In each case there was 3.7% of available sulfur on the rubber. The compositions of these stocks were as follows:

|  | A | B |
|---|---|---|
| Fine para rubber | 50 | 50 |
| Zinc oxide | 2.25 | 2.25 |
| Golden antimony | 8.5 | 8.5 |
| Sulfur | .4 | .4 |
| Diphenylguanidine | .5 |  |
| Di-o-tolylguanidine |  | .5 |

In 45 minutes at 45 lbs. steam pressure stock B is non-blooming, while stock A containing diphenylguanidine shows considerable bloom. This indicates that di-o-tolylguanidine is the more powerful accelerator showing a greater percentage of combined sulfur. The tensile strength of the stock containing di-o-tolylguanidine is higher showing a more powerful accelerating action.

The relative tensile strengths of the two compounds are as follows:

| Stock | Cure | Tensile strength | Elongation (%) |
|---|---|---|---|
| A | 75 min. at 45 lbs. (steam pressure) | 2480 lbs./sq. in.<br>2300 lbs./sq. in. | 665<br>665 |
| A | 135 min. at 30 lbs. (steam pressure) | 2280 lbs./sq. in.<br>2320 lbs./sq. in. | 665<br>665 |
| B | 75 min. at 45 lbs. (steam pressure) | 2660 lbs./sq. in. | 675 |
| B | 135 min. at 30 lbs. (steam pressure) | 2440 lbs./sq. in.<br>2560 lbs./sq. in. | <br>650 |

This shows the higher curing power of di-o-tolylguanidine in a low sulfur stock. If higher amounts of sulfur are used a still greater divergence can be shown.

To further illustrate the difference between the effect of diphenylguanidine and ditolylguanidine on vulcanization, two comparable rubber stocks were prepared which were low in both zinc oxide and sulfur, and had the following compositions:

|  | C | D |
|---|---|---|
| Smoked sheet rubber | 75 | 75 |
| Zinc oxide | 1.5 | 1.5 |
| Sulfur | 2.25 | 2.25 |
| Diphenylguanidine | .375 |  |
| Di-o-tolylguanidine |  | .375 |

It may be noted that in the two sets of formulas given equal weights of the two accelerators are used, and since the molecular weight of di-o-tolylguanidine is greater than that of diphenylguanidine, there is actually being compounded a larger molecular proportion of the latter accelerator than of the former. If these accelerators were to be compared in molecular proportion the ditolylguanidine would show up to a still greater advantage.

In stocks C and D above, the latter reaches a non-blooming cure above 15–20 minutes quicker than the stock containing diphenylguanidine. For example, after ageing for five months the 1 hour cure on stock D shows no bloom while stock C shows a slight bloom in 1 hour and 15 minutes. The optimum cure for stock D is 50 minutes while that for stock C is 1 hour and 10 minutes.

In a series of vulcanizations on stocks C and D, all cures were made in a double mold so that the two stocks were as nearly equally heated as is possible.

Data showing the comparative tensile strength and elongation of stocks C and D are listed in the following table:

| Time at 40 lbs. steam pressure | Tensile strength | | Elongation (%) | |
|---|---|---|---|---|
| | C | D | C | D |
| 30 minutes | 2250 | 2120 | 875 | 860 |
| 45 minutes | 2630 | {3090 / 3050} | 845 | {790 / 785} |
| 60 minutes | {2580 / 2740} | {3120 / 3160} | {795 / 815} | {770 / 780} |
| 75 minutes | {3030 / 2760} | {2980 / 3040} | {800 / 790} | {775 / 760} |
| 90 minutes | {2530 / 2820} | {3080 / 3100} | {775 / 795} | {760 / 775} |
| 120 minutes | {2470 / 2980} | {2930 / 3160} | {785 / 825} | {790 / 790} |
| 150 minutes | {2500 / 2480} | {2700 / 2680} | {800 / 800} | {795 / 800} |
| 180 minutes | {2300 / 2500} | {2560 / 2570} | {810 / 800} | {825 / 825} |

In the above table the tensile strength is expressed in pounds per square inch.

This data shows quite clearly the higher curing power of di-o-tolylguanidine over diphenylguanidine. The lower elongation on shorter cures indicates a more rapid vulcanization, as does also the higher tensile in 45 minutes and 1 hour. This higher curing power of ditolylguanidine is most pronounced when it is used in the rubber mix in conjunction with zinc oxide or equivalent materials such as magnesium oxide, litharge, or lime.

The rubber whose vulcanization may be effected in accordance with my invention includes synthetic as well as natural rubber. While I have given specific examples of procedure and have mentioned di-ortho-tolylguanidine as the preferred accelerator, it will be understood that I do not regard the invention as dependent on the specific procedure or materials mentioned, since the conditions of operation, ingredients, and proportions of ingredients may be varied considerably. By the term ditolylguanidine I include the di-meta- and di-para-tolylguanidines as well as the di-ortho-tolylguanidine.

I claim:—

1. The process of effecting the vulcanization of rubber which comprises incorporating with a rubber mix a ditolylguanidine and then vulcanizing the mix.

2. The process of effecting the vulcanization of rubber which comprises incorporating with a rubber mix di-ortho-tolyl-guanidine and then vulcanizing the mix.

3. The process of effecting the vulcanization of rubber which comprises incorporating a ditolylguanidine with a rubber mix containing zinc oxide, and then vulcanizing the mix.

4. The process of effecting the vulcanization of rubber which comprises incorporating di-ortho-tolylguanidine with a rubber mix containing zinc oxide, and then vulcanizing the mix.

5. A vulcanized rubber product obtainable by inducing a reaction between rubber, a vulcanizing agent, and a ditolyl-guanidine.

6. A vulcanized rubber product obtainable by inducing a reaction between rubber, a vulcanizing agent, and di-o-tolylguanidine.

7. A vulcanized rubber product obtainable by inducing a reaction between rubber, a vulcanizing agent, zinc oxide, and a ditolylguanidine.

8. A vulcanized rubber product obtainable by inducing a reaction between rubber, a vulcanizing agent, zinc oxide, and di-o-tolylguanidine.

9. A vulcanized compound of rubber combined with a vulcanizing agent and a ditolylguanidine.

10. The process of treating rubber or similar materials which comprises combining with the rubber compound di-ortho-tolyl guanidine.

11. The process of treating rubber or similar materials, which comprises combining with the rubber compound a vulcanizing agent and di-ortho-tolyl guanidine.

12. A vulcanized compound of rubber or similar material combined with a vulcanizing agent and di-ortho-tolyl guanidine.

13. Vulcanized rubber products vulcanized with a small addition of a ditolyl substituted guanidine.

14. A process of vulcanizing rubber which consists in, incorporating a di-tolylguanidine with compounded rubber as an accelerator, then heating the resulting rubber mixture with sulphur and vulcanizing.

In testimony whereof I affix my signature.

WINFIELD SCOTT.